(12) United States Patent
Lee

(10) Patent No.: US 9,035,995 B2
(45) Date of Patent: May 19, 2015

(54) METHOD AND APPARATUS FOR WIDENING VIEWING ANGLE IN VIDEO CONFERENCING SYSTEM

(71) Applicant: ELECTRONICS AND TELECOMMUNICATIONS RESEARCH INSTITUTE, Daejeon (KR)

(72) Inventor: Mi Suk Lee, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 86 days.

(21) Appl. No.: 14/061,704

(22) Filed: Oct. 23, 2013

(65) Prior Publication Data

US 2014/0111601 A1    Apr. 24, 2014

(30) Foreign Application Priority Data

Oct. 23, 2012   (KR) .................. 10-2012-0118123
Oct. 21, 2013   (KR) .................. 10-2013-0125533

(51) Int. Cl.
   *H04N 7/15*    (2006.01)
   *H04N 7/14*    (2006.01)
   *H04N 5/232*   (2006.01)

(52) U.S. Cl.
   CPC .............. *H04N 7/15* (2013.01); *H04N 7/147* (2013.01); *H04N 5/23296* (2013.01)

(58) Field of Classification Search
   CPC ...... H04N 5/23296; H04N 7/147; H04N 7/15
   USPC ............................... 348/14.01–14.16
   See application file for complete search history.

(56) References Cited

U.S. PATENT DOCUMENTS

| | | | |
|---|---|---|---|
| 8,874,090 B2* | 10/2014 | Abuan et al. ................ | 455/416 |
| 2004/0263476 A1 | 12/2004 | Lim et al. | |
| 2011/0085016 A1* | 4/2011 | Kristiansen et al. ....... | 348/14.03 |
| 2013/0002802 A1* | 1/2013 | Mock ........................ | 348/14.03 |

FOREIGN PATENT DOCUMENTS

| | | |
|---|---|---|
| KR | 10-1998-026645 A | 7/1998 |
| KR | 10-2000-0037653 A | 7/2000 |
| KR | 10-2005-0000276 A | 1/2005 |

* cited by examiner

*Primary Examiner* — Melur Ramakrishnaiah

(57) ABSTRACT

A method and apparatus for widening a viewing angle in a video conferencing system are provided. The apparatus for widening a viewing angle in a video conferencing system includes: generating reference data from images of a video conference participant captured by a camera included in the video conferencing system; generating movement data based on the video conference participant's movements sensed by the camera; extracting a first control parameter by comparing the reference data with the movement data; transmitting the first control parameter to the other end of the conference; receiving a second control parameter generated at the other end of the conference; and controlling the camera by the second control parameter.

8 Claims, 2 Drawing Sheets

METHOD AND APPARATUS FOR WIDENING VIEWING ANGLE IN VIDEO CONFERENCING SYSTEM

CROSS-REFERENCE TO RELATED APPLICATION

This application claims priority to and the benefit of Korean Patent Application Nos. 10-2012-0118123 and 10-2013-0125533 filed in the Korean Intellectual Property Office on Oct. 23, 2012 and Oct. 21, 2013 respectively, the entire contents of which are incorporated herein by reference.

BACKGROUND OF THE INVENTION (a) Field of the Invention

The present invention relates to a method and apparatus for widening a conference participant's viewing angle in a video conferencing system.

(b) Description of the Related Art

Numerous person-to-person/business-to-business video conferencing systems using Internet technology are used. A video conferencing system is a system that enables people at two or more physically separated locations to meet in real time over the Internet.

Typically, the video conferencing system includes a camera for capturing participants in a conference, a microphone for collecting audio produced from the participants, a processing system for compressing, packetizing, transmitting the video and audio signal and receiving, unpacketizing, uncompressing the video and audio signal from remote site, and a display and speaker to play out the video and audio signal of remote participants.

In recent video conferencing systems, the camera could be controlled by a main speaker among the conference participants. Therefore, the participant sitting at the remote site only views the participant who is speaking, regardless of whether they want to or not.

SUMMARY OF THE INVENTION

The present invention has been made in an effort to provide a method and apparatus for widening a viewing angle of conference participants, by which naturally control the camera of remote site depending on whether each conference participant wants it to or not.

An exemplary embodiment of the present invention provides a method for widening a viewing angle of participant in a video conferencing system. The method for widening a viewing angle may include: generating reference data from images of a video conference participant captured by a camera included in the video conferencing system; generating movement data based on the video conference participant's movements sensed by the camera; extracting a first control parameter by comparing the reference data with the movement data; transmitting the first control parameter to the other end of the conference; receiving a second control parameter generated at the other end of the conference; and controlling the camera by the second control parameter.

The generating of reference data may include generating reference data using at least either captured still images or movement patterns of the video conference participant.

The generating of movement data may include generating movement data using at least turning of the eyes, moving of the head, or tilting of the upper body.

In the method for widening a viewing angle, the reference data may be updated at predetermined time intervals.

Another exemplary embodiment of the present invention provides an apparatus for widening a viewing angle of participant in a video conferencing system. The apparatus for widening a viewing angle may include: a camera controller that generates reference data from images of a video conference participant captured by a camera included in the video conferencing system, generates movement data based on the video conference participant's movements sensed by the camera, and controls the camera by a first control parameter generated at the other end of the conference; a parameter extractor that extracts the first control parameter by comparing the reference data with the movement data; and a signal processor that transmits the first control parameter to the other end of the conference and receives a second control parameter generated at the other end of the conference.

In the apparatus for widening a viewing angle of participant, the camera controller may generate reference data using at least either captured still images or movement patterns of the video conference participant.

In the apparatus for widening a viewing angle of participant, the camera controller may generate movement data using at least turning of the eyes, moving of the head, or tilting of the upper body.

In the apparatus for widening a viewing angle of participant, the camera controller may update the reference data at predetermined time intervals.

DETAILED DESCRIPTION OF THE EMBODIMENTS

Figure 1:
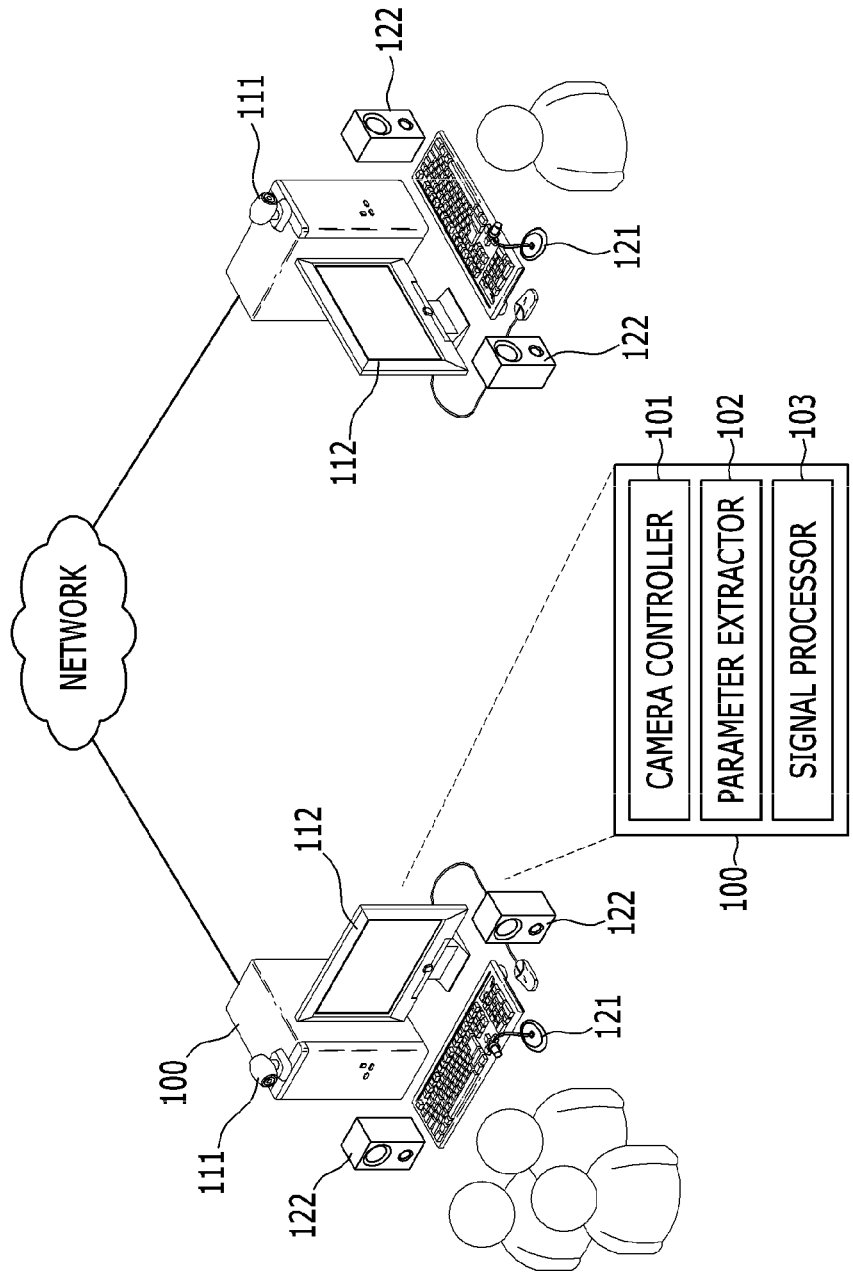
FIG. 1 is a view showing a video conferencing system according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

In the specification, unless explicitly described to the contrary, the word "comprise" and variations such as "comprises" or "comprising" will be understood to imply the inclusion of stated elements but not the exclusion of any other elements. In addition, terms such as "unit", ". . . er/or", "module", and "block" described in the specification mean units for processing at least one function and operation, and can be implemented by hardware components or software components and combinations thereof.

FIG. 1 is a view showing a video conferencing system according to an exemplary embodiment of the present invention.

Referring to FIG. 1, the video conferencing system according to the exemplary embodiment of the present invention includes video processing equipment such as a camera 111 and a display 112, audio processing equipment such as a microphone 121 and a speaker 122, and a controller 100.

In addition, the controller 100 of the video conferencing system according to the exemplary embodiment of the present invention may include a camera controller 101, a parameter extractor 102, and a signal processor 103.

The camera 111 captures participants in a conference and generates video signals. The camera 11 is capable of adjusting the shooting direction and zooming. For example, the camera 111's shooting direction and zooming operation can be adjusted toward a participant who is speaking, among the conference participants, through the use of a pan-tilt-zoom (PTZ) camera. In this case, the video conferencing system allows the video of the speaking participant to always be displayed on the display 112 at the other end of the conference.

The camera controller 101 can generate reference data from images captured by the camera 111, and sense each conference participant's body movements and generate movement data. The reference data may be generated from still images or movement patterns of each conference participant, and may be updated at predetermined time intervals. The movement data may be generated from moving images. Moreover, the camera controller 101 can control the camera 111 with control parameters transmitted from the other end of the conference.

The parameter extractor 102 compares the reference data with the movement data and extracts control parameters used to control the camera 111 of remote site.

The signal processor 103 transmits the control parameters to the other end of the conference, and receives the control parameters transmitted from the other end of the conference. Moreover, the signal processor 103 compresses generated video and audio signals and transmits them to a network, and receives a packet from the network and separates the video signal and the audio signal from the received packet.

The display 112 outputs the video signal separated by the signal processor 103 and produces video of a participant at a remote location at the other end of the conference.

The microphone 121 receives a participant's voice and generates an audio signal, and the speaker 122 outputs the audio signal separated by the signal processor 103 and produces the voice of the participant in the remote location at the other end of the conference.

The operation of the video conferencing system according to the present invention will be described below in detail with reference to FIG. 2.

Figure 2:
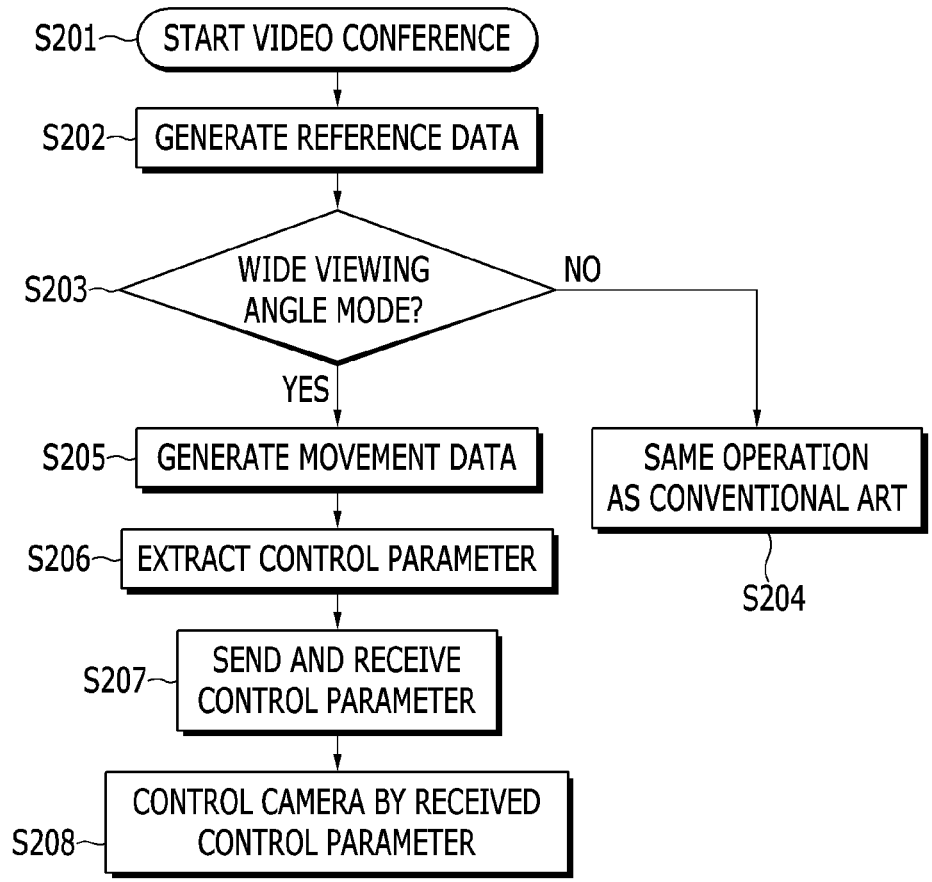
FIG. 2 is a flowchart showing the operation of a video conferencing system according to an exemplary embodiment of the present invention.

FIG. 2 is a flowchart showing the operation of a video conferencing system according to an exemplary embodiment of the present invention.

Firstly, a video conference takes place at Conference Point A and Conference Point B, and Conference Point A and Conference Point B can share their videos and audios.

When the video conference is started (S201), the camera controller 101 at each conference point generates reference data by using images of multiple conference participants or movement patterns of the conference participants (S202). The reference data may be updated at predetermined time intervals.

It is determined whether a conference participant selects a wide viewing angle mode (S203). If the wide viewing angle mode is not selected, the video conferencing system according to the exemplary embodiment of the present invention operates in the same way as a conventional video conferencing system (S204).

On the other hand, when a conference participant selects a wide viewing angle mode, the camera controller 101 senses each conference participant's body movements and generates movement data (S205). The body movements sensed by the camera 111 may include turning of the eyes, moving of the head, tilting of the upper body, and so on.

The parameter extractor 102 extracts control parameters by comparing the movement data with the reference data (S206). The control parameters may include a parameter for controlling the shooting direction of the camera 111 of remote site and a parameter for controlling the zooming operation of the camera 111 of remote site.

The signal processor 103 then transmits the control parameters extracted by the parameter extractor 102 to the other end of the conference (S207). The signal processor 103 at the other end of the conference receives the control parameters and passes them to the camera controller 101. The camera controller 101 then controls the camera 111 by the control parameters transmitted from the other end of the conference so that images of each conference participant can be captured depending on whether each conference participant sitting at the other end of the conference wants it or not (S208).

That is, by receiving the control parameters extracted based on the body movements of participant at the other end of the conference and controlling the camera 111 by the received control parameters, the shooting direction or zooming operation of the camera 111 located at the current conference point can be controlled based on body movements, such as turning of the eyes, of the conference participant at the other end of the conference.

According to the exemplary embodiment of the present invention, the viewing angle of a camera in a video conferencing system can be widened depending on the movements of conference participant by sensing the conference participant's body movements, such as turning of the eyes, and control the camera that captures the conference from a remote location.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for widening a viewing angle in a video conferencing system, the method comprising:
   generating reference data from images of a video conference participant captured by a camera included in the video conferencing system;
   generating movement data based on the video conference participant's movements sensed by the camera;
   extracting a first control parameter by comparing the reference data with the movement data;
   transmitting the first control parameter to the other end of the conference;
   receiving a second control parameter generated at the other end of the conference; and
   controlling the camera by the second control parameter.

2. The method of claim 1, wherein the generating of reference data comprises generating reference data using at least either captured still images or movement patterns of the video conference participant.

3. The method of claim 1, wherein the generating of movement data comprises generating movement data using at least turning of the eyes, moving of the head, or tilting of the upper body.

4. The method of claim 1, wherein the reference data is updated at predetermined time intervals.

5. An apparatus for widening a viewing angle in a video conferencing system, the apparatus comprising:
   a camera controller that generates reference data from images of a video conference participant captured by a camera included in the video conferencing system, generates movement data based on the video conference participant's movements sensed by the camera, and controls the camera by a first control parameter generated at the other end of the conference;

a parameter extractor that extracts the first control parameter by comparing the reference data with the movement data; and a signal processor that transmits the first control parameter to the other end of the conference and receives a second control parameter generated at the other end of the conference.

6. The apparatus of claim 5, wherein the camera controller generates reference data using at least either captured still images or movement patterns of the video conference participant.

7. The apparatus of claim 5, wherein the camera controller generates movement data using at least turning of the eyes, moving of the head, or tilting of the upper body.

8. The apparatus of claim 5, wherein the camera controller updates the reference data at predetermined time intervals.

* * * * *